G. W. JACKMAN.
Wagon Brakes.
No. 134,065.  Patented Dec. 17, 1872.
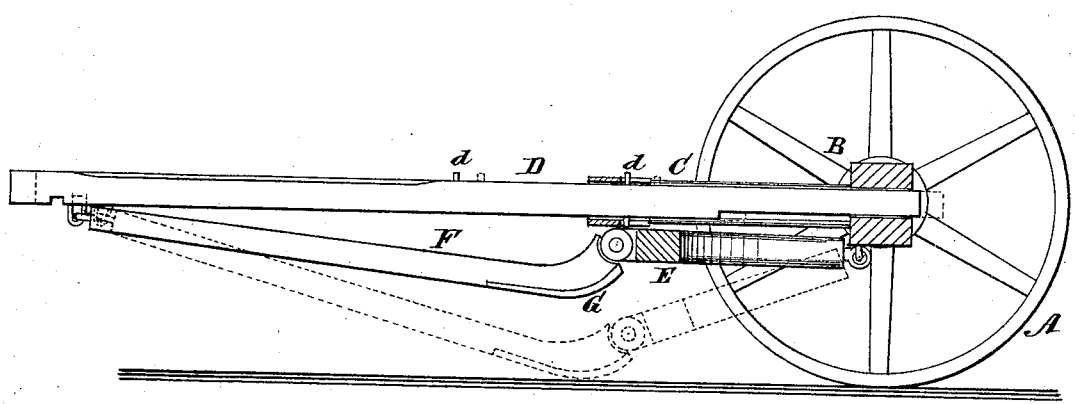

UNITED STATES PATENT OFFICE.

GEORGE W. JACKMAN, OF BATH, NEW HAMPSHIRE.

IMPROVEMENT IN WAGON-BRAKES.

Specification forming part of Letters Patent No. 134,065, dated December 17, 1872.

*To all whom it may concern:*

Be it known that I, GEORGE W. JACKMAN, of Bath, in the county of Grafton and State of New Hampshire, have invented an Automatic Brake for Wagon or Ox-Cart, of which the following is a specification:

The invention consists in forming an automatic brake of a bar pivoted near the end of a sliding tongue, and jointed to a brace hinged to the axle, whereby the holding back of the animals applies the brake. It also consists in a peculiar mode of curving the bar and jointing it to the brace so as to give relief to the strain upon the necks of oxen.

In the drawing the figure is a longitudinal vertical section.

A A in the drawing are a pair of wheels, B the axle, and C C the hounds. D is a tongue, which slides between the hounds C C and through the axle B, while it may be provided with two studs or stops, d d. E is a bifurcated brace whose prongs are pivoted or hinged at their free ends to the axle, and to which is jointed a bar, F. The end of this bar F, which is jointed to brace, is curved and protected by a metallic facing or plate, G, while the other end is pivoted near the front end of tongue.

The operation is as follows: When the horses or oxen hold back, the tongue D slides rearwardly through the hounds and axle. This has the effect to throw down the bar F and brace E, the former against the ground and the latter braced against it from the axle. The friction is thus applied at or near the slightly-curved end of bar F. By the latter the forward pressure of load is made to diminish the weight or downward pressure upon the yoke of oxen. The brace E operates as a lever whose fulcrum is at its point of contact with ground, and the power of this as a brake is in direct proportion to the forward pressure of load.

I make the joint between bar and brace at the point of contact with ground when my brake is applied to wagons in which the weight does not rest upon the necks of the animals; but this is not desirable in ox-carts, because the lifting support at end of tongue to relieve the oxen would not then be obtained.

The friction of this brake may be increased by shortening and decreased by lengthening the brace.

Having thus described my invention, what I claim as new, and desire to secure by Letters Patent, is—

1. The brake, consisting of bar F and brace E, combined with sliding tongue D, as described.

2. The brake-bar F, curved at G and jointed thereabove to the brace E, to adapt it particularly to ox-carts, as described, for the purpose of relieving the necks of the animals from the weight of load.

GEORGE W. JACKMAN.

Witnesses:
 DUDLEY C. LANG,
 A. P. CARPENTER.